United States Patent [19]
Higa

[11] Patent Number: 6,151,088
[45] Date of Patent: Nov. 21, 2000

[54] LIQUID CRYSTAL DISPLAY APPARATUS

[75] Inventor: Masakatsu Higa, Kanagawa, Japan

[73] Assignee: Ricoh Co., Ltd., Tokyo, Japan

[21] Appl. No.: 08/917,930

[22] Filed: Aug. 27, 1997

[30] Foreign Application Priority Data

Aug. 27, 1996 [JP] Japan ..................... 8-244125

[51] Int. Cl.[7] .............................. G02F 1/1335
[52] U.S. Cl. ............................ 349/99; 349/101
[58] Field of Search ................. 349/99, 101, 179, 349/117, 129, 158, 159

[56] References Cited

U.S. PATENT DOCUMENTS

| | | | |
|---|---|---|---|
| 4,634,229 | 1/1987 | Amstutz et al. | 349/101 |
| 4,664,482 | 5/1987 | Kando et al. | 349/101 |
| 5,058,998 | 10/1991 | Yoshida et al. | 349/101 |
| 5,519,523 | 5/1996 | Madokoro et al. | 349/181 |
| 5,844,648 | 12/1998 | Higa | 349/117 |

*Primary Examiner*—William L. Sikes
*Assistant Examiner*—Dung Nguyen
*Attorney, Agent, or Firm*—Oblon, Spivak, McClelland, Maier & Neustadt, P.C.

[57] ABSTRACT

A novel liquid crystal display apparatus comprising: a liquid crystal cell having a structure in which a liquid crystal layer is sandwiched between a pair of transparent substrates each having at least one electrode, and liquid crystal molecules in said liquid crystal layer are oriented substantially in parallel to the surface of said substrate and twisted at an angle in the thickness direction of said liquid crystal layer when the voltage is not applied, a pair of polarizers disposed so as to sandwich said liquid crystal cell there between, wherein the angle of the polarized light transmission axis of said polarizer to the orientation of liquid crystal molecules in the middle of said liquid crystal layer is less than 10°.

8 Claims, 4 Drawing Sheets

FIG. 7a
SIDE VIEW

FIG. 7b
TOP PLAN VIEW

A~E: LIQUID CRYSTAL MOLECULES
A IS ORIENTED SUBSTANTIALLY IN PARALLEL TO THE SURFACE
C IS ORIENTED A ANGLE AT THE LEVEL WITH THE SURFACE
A~E ARE DESCRIBED AS "TWISTED"

LIQUID CRYSTAL DISPLAY APPARATUS

BACKGROUND OF THE INVENTION

The present invention relates to a supertwisted nematic liquid crystal display apparatus (hereinafter, referred to as "STN-LCD"), and particularly to a liquid crystal display apparatus such as a black-and-white STN-LCD which can be used in an Office Automation (OA) apparatus, for example, a word processor.

In a preferred embodiment a novel liquid crystal display apparatus is provided comprising: a liquid crystal cell having a structure in which a liquid crystal layer is sandwiched between a pair of transparent substrates each having at least one electrode, the liquid crystal molecules in said liquid crystal layer oriented substantially in parallel to the surface of said substrate and twisted at an angle in the thickness direction of said liquid crystal layer when the voltage is not applied, and a pair of polarizers disposed so as to sandwich said liquid crystal cell there between, wherein the angle of the polarized light transmission axis of said polarizer to the orientation of the liquid crystal molecules in the middle of said liquid crystal layer is less than 10°, including 9°, 8°, 7°, 6°, 5°, 4°, 2°, 1° and 0°.

Discussion of the Background

Conventional liquid crystal displays have substrates made of glass. However, there is another type of a liquid crystal display having transparent substrates provided by flexible material, for example, substrates made of a polymer (plastic) film or a plastic plate, instead of glass. The liquid crystal display devices having substrates using plastic films or plastic plates have many advantages compared with conventional liquid crystal display devices including, for example, thinness, lightness of weight, durability, etc.

Substrates of liquid crystal display devices are desirably optically isotropic. However, optically isotropic plastic substrates have not been put to practical use. Generally, plastic has optical anisotropy such as biaxial optical anisotropy. Therefore, when the viewer sees a plastic substrate from a slant direction, the retardation value (the product of thickness and refractive anisotropy) is different from the retardation value when viewed from the front direction. A color unevenness on the panels of liquid crystal display devices having plastic substrates appears because of changes in retardation value.

Such display devices with plastic substrates have been attracting much attention in recent years for use in hand held information communication terminals and other uses. Among others, relatively small twisted-nematic (TN) liquid crystal devices have been placed into practical uses such as display devices of card type pagers and electronic calculators.

In addition, efforts are in progress for developing super-twisted-nematic (STN) liquid crystal devices, utilizing birefringence of liquid crystal materials.

Although a plastic film material is preferably optically isotropic for use as the substrate for the display device, no such a film has been available yet. Since a plastic film is thus optically anisotropic, in general, several attempts have been made to obviate this difficulty and make use of the film for adequately forming substrates for display devices. For example, it is disclosed in Japanese Laid-Open Patent Publication No. 60-78420 that a substrate is formed to have a retardation value of at most 15 nm. As another example, in Japanese Laid-Open Patent Publication No. 61-100726, a display device is fabricated such that the optical axis direction of a substrate film and the absorption axis direction of a polarizing plate are either coincident or perpendicular to each other.

Further, a plastic film generally has different refractive indices not only between in-plane directions but also between the plane and thickness directions. That is, the film is biaxially anisotrotropic. This difference in refractive indices along the thickness direction gives rise to an effect such that a retardation value at a tilted viewing angle is different from that in the frontal viewing direction.

Such changes in refractive indexes at the viewing angle may degrade the display characteristics of the liquid crystal display panel using film substrates, as evidenced by the changes with the viewing angle in brightness, color tone and contrast, of the liquid crystal display device.

As a further example, in an STN type liquid crystal display device which includes a phase difference film interposed between a liquid crystal cell and a polarizing plate disclosed in Japanese Laid-Open Patent Publication No. 2-289824, an improvement in display visibility is disclosed after specifying refractive index values ($n_z$) in the thickness direction of the phase difference film. To be more specific, a refractive index $n_x$ along a retardation axis (maximum refractive index), another in-plane refractive index $n_y$ along an advancing axis, which is perpendicular to the retardation axis, and the above-mentioned refractive index $n_z$ along the thickness direction, are made such that $n_y < n_z \leq n_x$. In addition, it is described in SID Digest (1992), pages 397 to 400, that the change in the retardation value of a phase difference film is minimum when the film is formed to have the indexes such that $n_z = (n_z - n_x)/2$.

With the recent progress in manufacturing techniques of plastic film substrate, the optical anisotropy in the surface plane direction has been decreased, in which manufacturing the films has become feasible with the precision of optical axis direction of within 10°, and/or the retardation value of at most 30 nm, and at most 10 nm, in some instance. However, difficulties in controlling the refractive index along the film thickness direction ($n_z$) are yet to be resolved, and practical use of such films has not been achieved.

Although the use of the phase difference film itself as a substrate may further be considered, it is quite difficult for the phase difference film to be formed so as to comply with several requirements for satisfactory substrate properties for forming the substrate of the liquid crystal display device, and such a substrate has not been formed yet.

As examples of these above requirements, the substrate has to have satisfactory resistance against chemicals and solvents which are used during fabrication process steps, sufficient barrier capability against gases, and satisfactory surface flatness.

Accordingly, there have been strong demands for attaining satisfactory materials and structure for fabricating liquid crystal display devices, in which display quality thereof are not degraded with the change in viewing angle, even when the retardation value of the substrate changes with viewing angle, which is caused by the refractive index smaller along the film thickness direction than that along the plane surface direction. Incidentally, the above-noted degradation with the viewing angle is referred to those related to brightness, color tone and contrast, of the liquid crystal display device.

SUMMARY OF THE INVENTION

In view of the foregoing, one object of the present invention to provide a novel liquid crystal display apparatus which is light, resistant to shocks, and has high contrast monochromatic display characteristics.

Another object of the present invention is to provide a novel liquid crystal device of high display quality, which has an improved viewing angle characteristics achieved by minimizing the effects of viewing angle, caused by a substrate. Even though a plastic film substrate is used, which is optically anisotropic, having a different refractive index along the film thickness direction from that in-plane directions, a liquid crystal display device according to the present invention is fabricated such that the effects on the viewing angle characteristics of the display device by the change in the retardation value can be minimized, thereby overcoming the above-mentioned effects caused by the difference in refractive indexes.

In accordance with the present invention, the above object is provided by a novel liquid crystal display apparatus whose substrates are made from a polymer film or plastic plate more resistive to shocks and impacts than glass, in which the color tone is preferably an achromatic color, and which can preferably provide a stable black-and white monochromatic display and a stable contrast.

Thus, according to another embodiment of the present invention, a liquid crystal display device is provided, including a liquid crystal cell having two transparent plastic substrates arranged substantially in parallel, each substrate with a confronting surface bearing at least one electrode; an alignment film disposed over the at least one transparent electrode; a layer of nematic liquid crystal material contained between the substrate, the liquid crystal material being twisted in a predetermined angle; and a pair of polarizing plates each provided on the outer surface of each substrate. The substrate is an optically anisotropic body, and refractive indices in the surface direction are different from that in the thickness direction of the substrate. In addition, an angle is preferably at most 10° between either the transmission of absorption axis of the polarizing plates (that is, the angle is ranging from +10° to −10°), and the alignment direction of liquid crystal molecules in the middle portion in the thickness direction of the liquid crystal layer. With this structure, the degradation in display quality may thus be prevented.

In another embodiment, the liquid crystal display device described above in the first embodiment is fabricated such that the angle between the alignment direction of liquid crystal molecules on the plastic substrate and either the transmission or absorption axis of the polarizing plate neighbored to the substrate, is preferably 30° to 60°. The liquid display device may thereby be fabricated so as to make the most use of the birefringence of the liquid crystal molecules.

In another embodiment, the liquid crystal display device described above in either the first or second embodiment is fabricated such that the twist angle of the nematic liquid crystal layer is preferably either from 40° to 140°, or from 220° to 320°.

With this structure, the liquid crystal display device is fabricated to make the most use of the birefringence of the liquid crystal molecules, to thereby attain a high contrast, and to further be able to prevent the degradation in display quality.

As to the viewing characteristics of the liquid crystal display device of the present invention, the change in the retardation value at 50° tilted viewing angle from that in the frontal viewing direction is preferably at most 80 nm, more preferably at most 40 nm.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 7b shows a top view of the liquid crystal from FIG. 7a.

Description of Reference Numerals

11 Rubbing direction for upper substrate
12 Rubbing direction for lower substrate
13 Direction of transmission axis of upper polarizing plate
14 Direction of transmission axis of lower polarizing plate
15 Direction of retardation axis of upper substrate
16 Direction of retardation axis of lower substrate
17 Substrate plane
21 Polarizing plate
22 Plastic film substrate
23 Transparent electrode
24 Seal
25 Alignment film
26 Spacer
27 Liquid crystal $\psi_{UR}$ Angle of rubbing direction for upper substrate 11 measured from 6 o'clock direction $\psi_{LR}$ Angle of rubbing direction for lower substrate 12 measured from 6 o'clock direction $\psi_{UT}$ Angle of transmission axis direction for upper polarizing plate 13 measured from 6 o'clock direction $\psi_{LT}$ Angle of transmission axis direction for lower polarizing plate 14 measured from 6 o'clock direction 61 Rubbing direction for upper substrate
62 Rubbing direction for lower substrate
63 Alignment direction of the liquid crystal molecules in the middle portion in the layer thickness direction
64 Tilted viewing direction projected onto substrate
65 Direction perpendicular to viewing direction ($n_x$ direction for upper and lower substrates)

$\omega$ Twisted angle for liquid crystal layer $\psi A$ Angle between the alignment direction 63 of the liquid crystal molecules in the middle portion in the layer thickness direction and the viewing direction projected onto the substrate $\alpha$ Angle between direction perpendicular to line 63 and rubbing direction

DETAILED DESCRIPTION OF THE PREFERRED EMBODIMENTS

Figure 1:
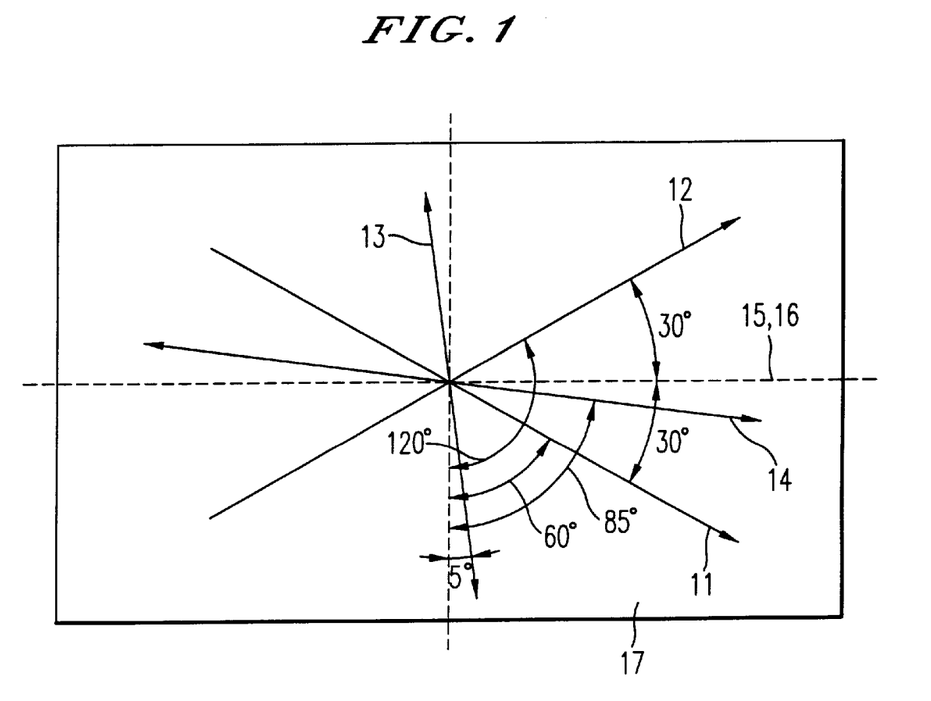
FIG. 1: A schematic showing an arrangement of a plurality of axes of a liquid crystal display device in the plane of the display panel according to an embodiment of the invention.
Figure 5:
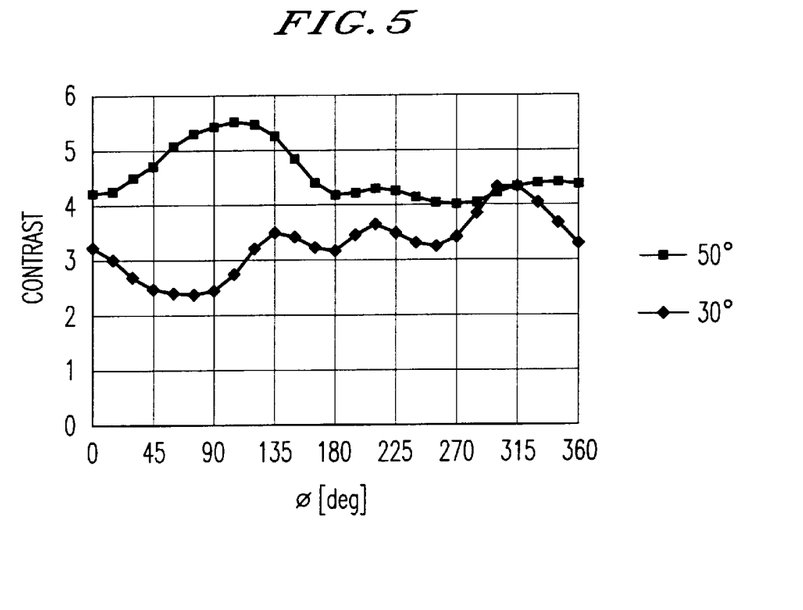
FIG. 5: A graphical plot of contrast as a function of incident angle under the conditions of 1/33 duty and 1/5 bias, for a liquid crystal display device according to the invention.
Figure 6:
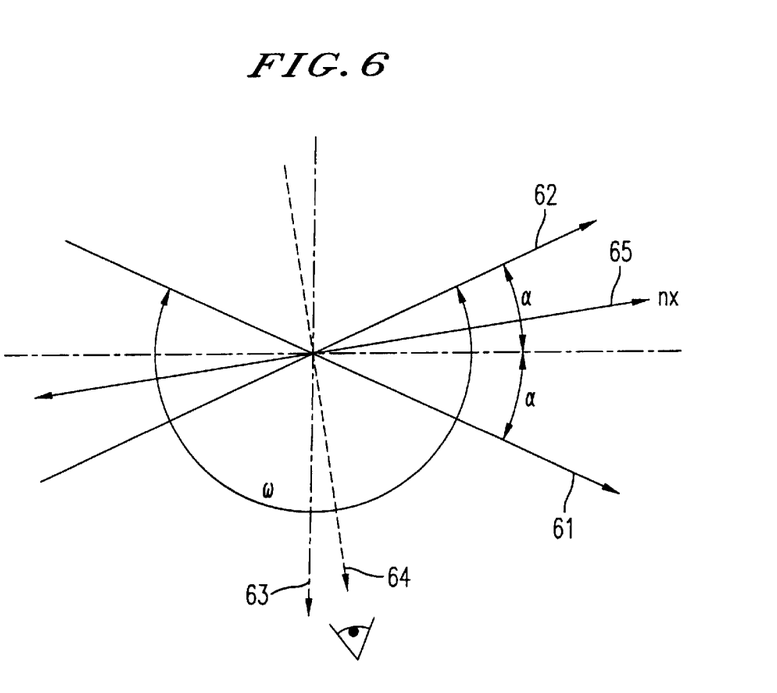
FIG. 6: A schematic showing another arrangement of a plurality of axes of a liquid crystal display device in the plane of the display panel according to the invention.

Referring now to the drawings, wherein like reference numerals designate identical or corresponding parts throughout the several views, and more particularly to FIGS. 1, 5 and 6 thereof, the present invention is now described in further detail.

As a base material for forming a substrate of a liquid crystal display device, a plastic film can be adequately used in the present invention. The plastic film is known, in general, to have optical anisotropy, in that refractive indices in the direction of surface plane of the film are different from those in the direction of the film thickness.

A plurality of methods of forming the film are known such as, for example, solvent casting and solvent extruding. The films formed by these methods have an optical anisotropy represented by the relation of refractive indices such as, in general, $n_z < n_y < n_x$. At least on one of surfaces of the base film, a gas barrier layer and a solvent resistant (or hard-coat) layer are disposed to be adequately used in the liquid crystal display device. In addition, on the other surface of the film, a transparent, electrically conductive film composed of ITO (indium tin oxide) is disposed thereon with, for example, the sputtering method.

Next, refractive indices will be discussed regarding the base film.

As an example, refractive indices at 589 nm wavelength were measured for a polycarbonate film prepared by the solvent casting method, having a thickness of 100 microns, using an Abbe's refractometer and an M-150 ellipsometer from Nihon Kogaku Co.

From the measurements, there obtained are an average refractive index of n=1.5831, in-plane refractive index along a retardation axis (maximum refractive index) of $n_x$=1.58364, another in-plane refractive index along an advancing axis of $n_y$=1.58354, and still another refractive index along the thickness direction of $n_z$=1.58212. Since the retardation value along the surface is therefore as small as about 10 nm, almost no effect of reduction in display quality is expected, when the display device, which is fabricated using the above film, is viewed frontally.

Figure 3:
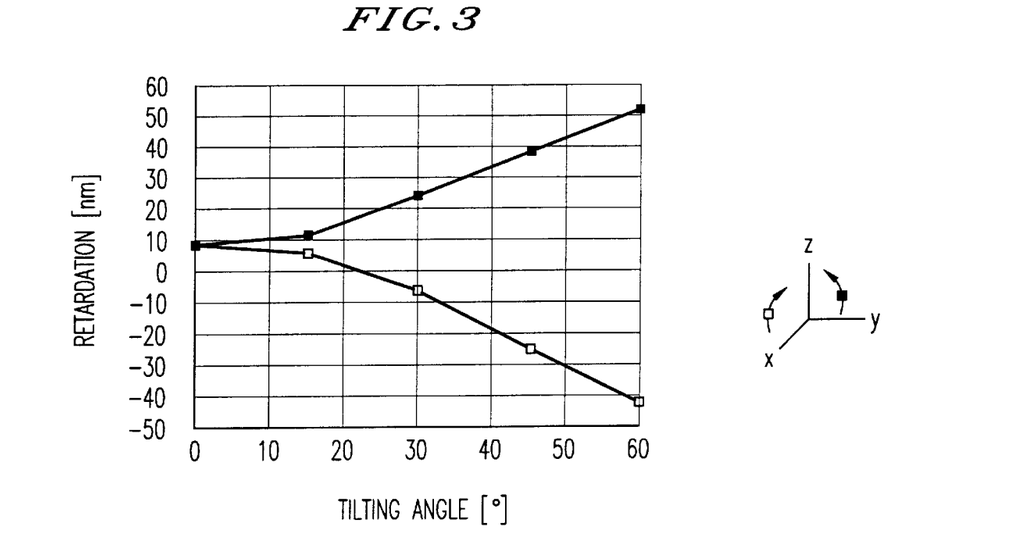
FIG. 3: A graphical plot of retardation value as a function of tilted viewing angle of a film substrate according to an embodiment of the invention.

In order to determine retardation values of for a slightly tilted film, another series of measurements were also carried out using a highly sensitive automatic birefringent measurement apparatus Model ADR-60XY from Oak Co. The results from the measurement are shown in FIG. 3.

When the film is tilted toward the $n_y$ direction with its tilted angle in the $n_y n_z$ plane, the retardation value increases. Whereas, when the film is tilted toward the $n_x$ direction with its tilted angle in the $n_z n_x$ plane, the retardation value decreases and the axis direction was found to change by 90° in the range of the tilted angle of to be equal to or larger than 20°. In both above cases, when viewed from the tilted angle direction, $n_z$ affects to decrease the refractive indices in the plane defined by the directions of both incident light and the normal of the substrate.

At 60° tilted angle, the retardation value is changed by 40 nm to 50 nm from that in the frontal viewing direction. This indicates that the change of the retardation value along the tilted viewing direction affects to degrade the display characteristics of the liquid crystal display panel, even when the retardation value in the frontal viewing direction is small.

In a similar manner to above, refractive indices were measured for a polycarbonate film prepared by the solvent extruding method. From the measurements, there obtained were an average refractive index of n=1.5831, in-plane refractive index along a retardation axis (direction of the maximum refractive index) of $n_x$=1.58335, another in-plane refractive index along an advancing axis of $n_y$=1.58332, and another refractive index along the thickness direction of $n_z$=1.58263, to thereby indicate that $n_z$ is smaller than either $n_x$ or $n_y$ in this case, too.

Although the above discussion was related to the case where $n_z$ is smaller than either $n_x$ or $n_y$, the description on the viewing angle dependence of the retardation value is also true for the base plate composed of, for example, polyethylene, for which $n_z$ is larger than either $n_x$ or $n_y$, as well.

From the rigorous examination by the present inventor regarding the effects of the retardation value of the plastic base film upon the optical characteristics of the liquid crystal cells, the following results are obtained.

1) When optical anisotropy of a substrate is sufficiently small than that of a liquid crystal layer, it is possible that the thickness ($d_{LC}$) and refractive index anisotropy ($\Delta n_{LC}$) of the liquid crystal is considered to be apparently changed by the optical anisotropy of the substrate, and that the optical anisotropy of the substrate is sufficiently included into that of the liquid crystal. That is, the retardation value of the substrate ($R_{sub}=\Delta n_{sub} \cdot d_{sub}$) affects such that the retardation value of the liquid crystal ($R_{LC}=\Delta n_{LC} \cdot d_{LC}$), which is defined by the product of the thickness ($d_{LC}$) and refractive index anisotropy ($\Delta n_{LC}$) of the liquid crystal, is changed to $R_{LC}^*$, and that any additional term from the substrate can be neglected, where $\Delta n_{sub}$ and $d_{sub}$ represent the refractive index anisotropy and thickness of the substrate, respectively.

2) When the optical anisotropy of the substrate is examined closely, in contrast, the apparent retardation value of the liquid crystal cell $R_{LC}^*$ is found to be expressed by the following equation (1), with the angle $\psi_{sub}$ between the retardation axis in the substrate plane and the alignment direction of the liquid crystal molecules.

$$R_{LC}^* = R_{LC} + R_{sub} \cdot \cos(2\psi_{sub}) \quad (1)$$

This relation is then deduced to:

$R_{LC}^* = R_{LC} + R_{sub}$, when $\psi_{sub}=0°$;

$R_{LC}^* = R_{LC} - R_{sub}$, when $\psi_{sub}=90°$; and $R_{LC}^* = R_{LC}$, when $\psi_{sub}=45°$.

The following case is examined regarding the substrate, where $n_z$ is larger than in-plane refractive indices such as $n_x$ and $n_y$. As described above, when this substrate is viewed from a tilted direction, refractive indices decreases in the plane defined by the directions of light beams and of the normal to the substrate plane, and the substrate is treated as an optically anisotropic body.

That is, the amount of the change in the refractive index along the tilted direction may be considered to always increase as the viewing direction approaches the normal. Therefore, when the directions of the retardation axes of respective upper and lower substrates are expressed in terms of the amount of the change in the refractive index, these axes can be considered parallel to each other. Namely, when the substrate is viewed from the direction tilted by $\psi A$, an axis with $n_x$ may be considered to be generated in the direction of $\psi A + 90°$.

In order to make the above discussion more understandable, a schematic illustration is included in FIG. 6. Referring to FIG. 6, the angle $\psi A$ is defined between the alignment direction 63 of the liquid crystal molecules in the middle portion in the layer thickness direction and the viewing direction 64 projected onto the substrate. In addition, optical anisotropy of the substrate originated from the viewing angle are assumed to have detardation axes $n_x$ in the direction of $\psi A+90°$, which are parallel to each other and each has a magnitude of $R_{sub}$ for the upper and lower substrates.

The amount of the change in the retardation value of the liquid crystal cell with the viewing angle ($\Delta R = R_{LC}* - R_{LC}$) is then derived from the equation (1) as follows.

$$\Delta R = R_{LC}* - R_{LC} = 2R_{sub} \cdot \cos(2\psi A) \cdot \cos(2\alpha) \qquad (2)$$

Accordingly, $\Delta R$ reaches its maximum at $\psi A=0°$ or $90°$. That is, the amount of the change in the retardation value of the liquid crystal cell is largest at these viewing angles. The apparent optical anisotropy in the substrate can be compensated by placing polarizing plates on the outer sides of the upper and lower substrates such that the angle $\psi A$ is equal or close to either $0°$ or $90°$.

In addition, since $\Delta R=0$ when $\alpha=\pm 45°$, the apparent optical anisotropy in the substrate can also be compensated (1) by adjusting the rubbing direction (or the direction of the liquid crystal molecules on the substrate) for the upper and lower substrates so as to achieve a predetermined twisting angle of the liquid crystal value, and (2) by approaching the value of $\alpha=\pm 45°$.

Accordingly, the liquid crystal display device according to the present invention preferably has an angle of at most $10°$, more preferably at most $0°$ to $5°$, between either the transmission or absorption axis of the polarizing plate, and the alignment direction of liquid crystal molecules in the middle portion in the direction of the liquid crystal layer thickness.

Further, when an angle $\alpha$ is defined between the rubbing directions for the upper and lower substrates and 3 o'clock direction, $R_{LC}*$ takes either its maximum or minimum.

In contrast, in order to realize a bright and high-contrast display device utilizing the birefringence of liquid crystal molecules, in general, the angle between the alignment direction and the polarization axis of the polarizing plate has to be adjusted close to equal to $45°$. Therefore, the angle between the alignment direction of liquid crystal molecules on the plastic substrate and either the transmission or absorption axis of the polarizing plate neighbored to the substrate, is preferably $30°$ to $60°$. At the angles larger than the above range, the degradation of the display brightness results, since the display device can not make the most use of the birefringence.

Still further, in order for the good visibility direction of the liquid crystal molecules in the middle portion in the liquid crystal layer thickness direction to be at 6 o'clock direction, the twist angle of the nematic liquid crystal layer is preferably either from $40°$ to $140°$, or from $220°$ to $320°$.

In addition, when the plastic film substrate has an optical anisotropy in the substrate plane, the retardation in the substrate plane is preferably at most 20 nm, and more preferably at most 10 nm, to suppress undesirable coloring during frontal viewing and the degradation of the display contrast.

The liquid crystal display device according to the present invention is preferably constructed, such that its outward shape is preferably rectangular, and that the direction of a side of the rectangle and the alignment direction of liquid crystal molecules in the middle portion in the thickness direction of the liquid crystal layer is preferably either parallel or orthogonal to each other. With this structure, several parts for fabricating the display device such as, for example, substrates and polarizing plates can be brought out in either parallel or perpendicular manner from respective raw rolls, this makes the efficient use feasible, such as, for example, the area available out of the rolls. This facilitates the reduction of the production costs, among others.

FIG. 1 is a top plan view of one embodiment of the invention. The vertical dashed line is the normal view direction. 11 is the orientation ($60°$) of liquid crystal molecules at the surface of an upper substrate, with the normal view direction, which molecules are preferably substantially parallel with the surface of the substrate (substantially $0°$ as vertical angle to surface of substrate). 12 is the orientation of liquid crystal molecules on the surface of lower substrate, with the normal view direction, $120°$. 15 is the maximum refractive index direction of surface of upper substrate, $90°$. 16 is the maximum refractive index direction of surface of lower substrate, $90°$. 13 is the transparent axis direction of upper polarizers, $5°$. 14 is the transparent axis direction of upper polarizers, $85°$. In this embodiment the luminosity index $L*$ is 26.4 and the chromaticity index $a*$ and $b*$ is $a*=-5.8$, $b*=5.9$.

Figure 2:
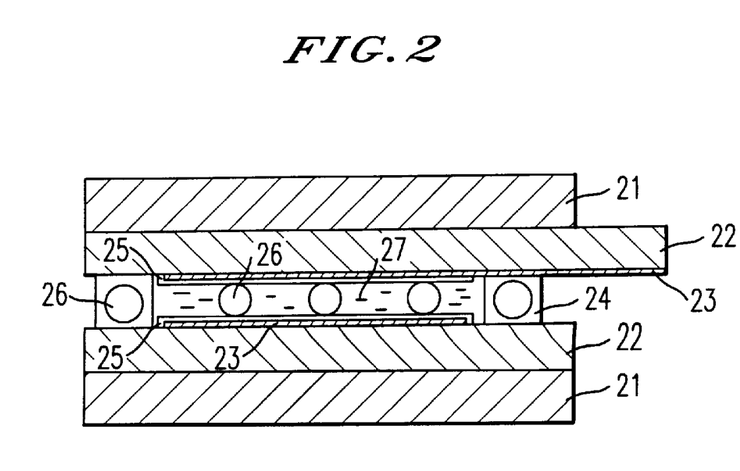
FIG. 2: A cross sectional view of a liquid crystal display device according to the invention.

FIG. 2 shows a LCD with plastic substrates. 21 is a polarizer, 22 is a substrate, 23 is an electrode. 24 is a seal part, 25 is an orientation membrane, 26 is a spacer and 27 is liquid crystal.

FIG. 3 shows the retardation of a plastic substrate with tilting angle. Under light of wavelength=589 n, the substrate having average refractive index=1.5831, maximum refractive index of surface=1.58364, minimum refractive index of surface=1.58354 and refractive index of thickness direction=1.5821. Therefore, the retardation of surface is about 10 nm. A liquid crystal display device using these plastic substrates appears to have a color unevenness because of the changes of retardation value with tilting angle direction.

In the prevent invention it has been found that the retardation value is a minimum when using a liquid crystal display apparatus comprising a liquid crystal cell having a side of the substrate parallel the orientation of liquid crystal molecules in the middle of the liquid crystal layer.

Figure 4:
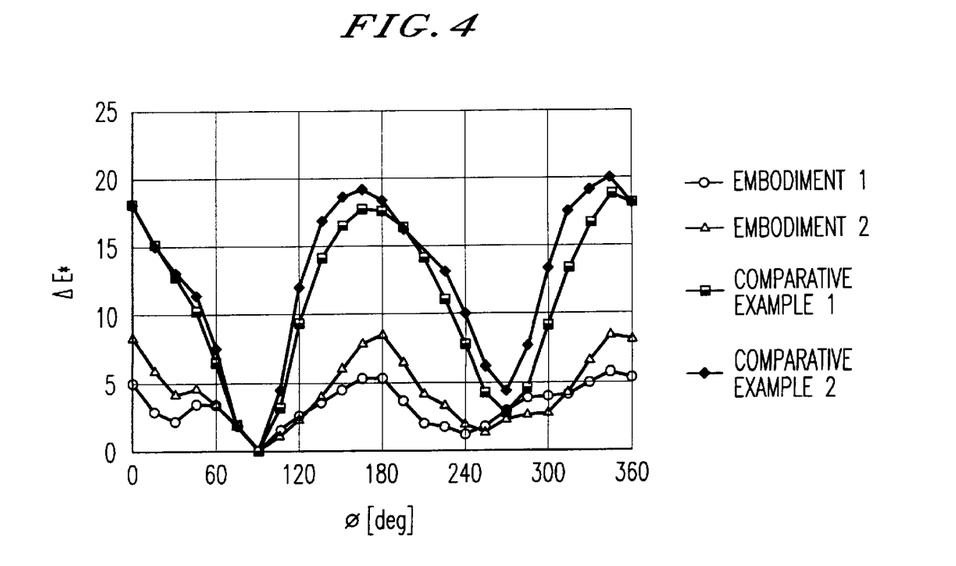
FIG. 4: A graphical plot of $\Delta E^*$ value as a function of incident angle for a liquid crystal display device according to the invention.

FIG. 4 shows $\Delta E*$ dependance on angle of view direction $\phi$. For embodiment 1 (FIG. 1) any angle $\phi$ shows $\Delta E*<6$.

In another embodiment (embodiment 2) comprising an angle of the polarized light transmission axis of upper polarizer of $10°$ and a angle of the polarized light transmission axis of lower polarizer of $80°$, a luminosity index $L*$ is 28.2 chromaticity index $a*$ and $b*$ is $a*=-8.4$, $b*=8.7$, any angle $\phi$ has a $\Delta E*$ of less than 9.

In one comparative example (comp. Ex. 1) where an angle of the polarized light transmission axis of upper polarizer is $20°$ and an angle of the polarized light transmission axis of lower polarizer is $70°$, a luminosity index $L*$ is 25.7 chromaticity index $a*$ and $b*$ is $a*=5.7$, $b*=5.5$, FIG. 4 shows that the $\Delta E*$ of this comparative example is more than any of the invention embodiments.

In another comparative example (comp. Ex. 2) where the twisted angle of liquid crystal molecules is $220°$, a luminosity index $L*$ is 25.1 chromaticity index $a*$ and $b*$ is $a*=7.7$, $b*=4.8$, FIG. 4 shows that the $\Delta E*$ of this comparative example is more than any of the invention embodiments.

FIG. 5 shows contrast dependance on angle of view direction $\phi$. For the embodiments tested a contrast of more than 2 was obtained.

FIG. 6 shows an embodiment of the invention where 61 is the orientation of liquid crystal molecules on the surface of the upper substrate, 62 is the orientation of LC molecules on the surface of the lower substrate, 63 is the orientation of LC molecules in the middle of the LC layer, 64 is the normal view direction, 65 is the direction having an angle of 90° to 64.

Figure 7A:
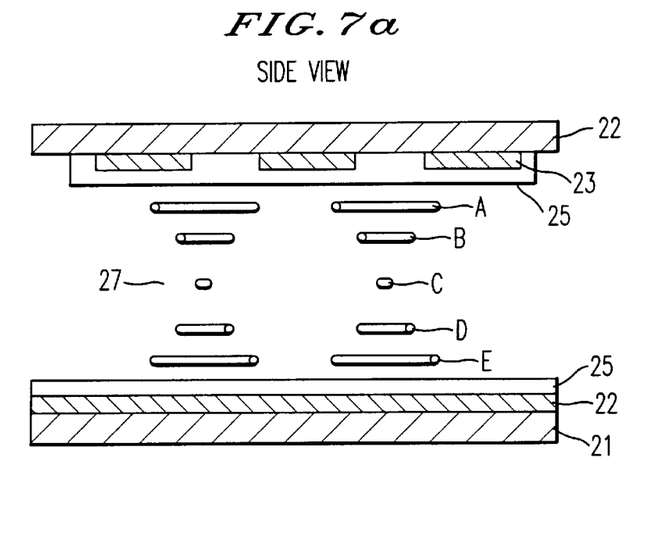
FIG. 7a: A side view of an embodiment of the invention.
Figure 7B:
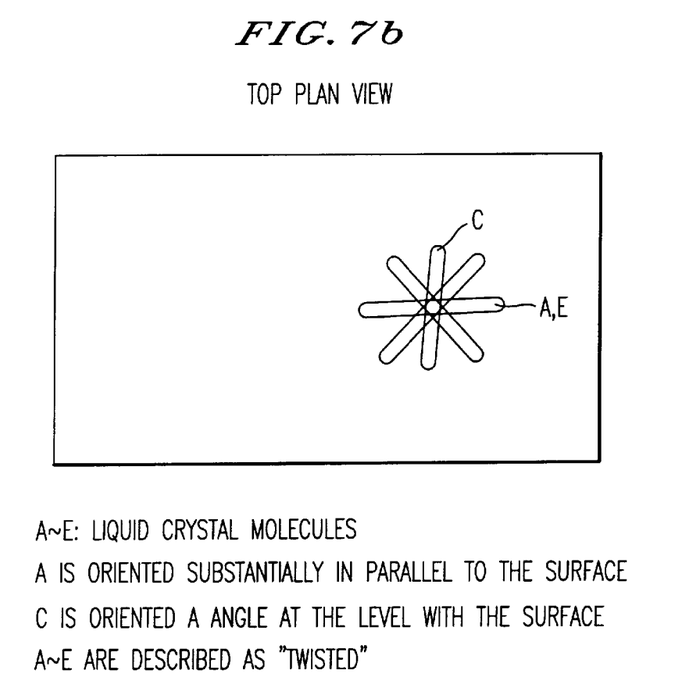

FIG. 7a shows an embodiment of the invention from a side view. FIG. 7b is a top plan view.

The invention may be made by those of ordinary skill using conventional techniques known to those of ordinary skill. Examples of useful substrates are acrylics, PVC, polycarbonates, polyesters, polyurethanes, polyamides, polyimides, etc. Orienting layers are those known in the art, as are orienting methods such as coating, rubbing, etc. LC molecules preferably show a nematic phase.

EXAMPLES

The invention will now be described in more detail with reference to the following examples.

Example 1

A plastic film substrate was prepared as follows. As a base material, a 100 microns thick film of polycarbonate was selected, which was manufactured by the solvent casting method. On both surfaces of the polycarbonate film, a gas barrier layer and a solvent resistant layer were subsequently disposed in that order. In addition, a transparent, electrically conductive film of ITO (indium tin oxide) is further disposed with the sputtering method, having a thickness of about 300 angstroms on one of the surface of the structure, whereby a plastic film substrate was formed.

Through conventional photolithography processes using a photoresist pattern, predetermined portions of the ITO layer were then removed to form a plurality of delineated stripes from the transparent substrate. A first and second substrates were thus prepared. Subsequently, the first and second substrates were arranged apart from, and opposed to each other so as to form a display panel capable of displaying a 32(column)×96(row) dot matrix and 12 characters. The retardation value of the plastic film substrate along the film plane was 10 manometers.

An alignment layer composed of Optomer AL3046 from Japan Synthetic Rubber Co was then disposed thereon, having a thickness of about 800 Å, and subsequently alignment treated by rubbing to result in a twist angle of 240° for a liquid crystal layer, that is, to have the visibility direction at 6 o'clock in the middle portion in the thickness direction of the liquid crystal layer. On the surface of the other substrate, a seal was printed with the screen printing method.

The pair of the substrate were subsequently arranged apart from, and opposed to each other with these transparent conductive layers facing each other, so as to form a liquid crystal display panel, being interposed by glass beads from Kaneke Co, having a diameter of about 6.7 microns.

The thus prepared structure or a liquid crystal cell was subsequently vacuum filled with a twisted nematic liquid crystal material and inlets were plugged by an ultraviolet light curing resin, whereby the liquid crystal cell was formed. The twisted nematic liquid crystal material used above was prepared beforehand to have a refractivity anisotropy of $\Delta n_{LC}$=0.115 at 589 nm wavelength and an intrinsic pitch of 12.4 microns.

On each of the outer surfaces of the liquid crystal cell, a transmissive color polarizing plate SCC2S-18SL and a semi-transmissive polarizing plate LL-82-12-WTU (both from Sun-Ritz Co) are placed, whereby the liquid crystal display panel was fabricated.

FIG. 1 is a schematic showing an arrangement of a plurality of axes of a liquid crystal display in the plane of the display panel according to a first embodiment of the invention.

Referring to FIG. 1, when display panel was viewed frontally, the angle ψ is defined as that measured counter-clockwise starting from 6 o'clock direction as 0°.

The directions 11, 12 of rubbing alignment for the top and bottom substrates are $\psi_{UR}$=60° and $\psi_{LR}$=120°, respectively. In addition, the direction of the retardation axes 15, 16 for top and bottom substrates are parallel to each other, each having an angle of ψ=90°(i.e., at 3 or 9 o'clock, respectively).

Further, the upper and lower polarizing plates are placed such that the directions 13, 14 of the transmission axes of the upper and lower polarizing plates are $\psi_{UT}$=5° and $\psi_{LT}$=85°, respectively.

Therefore, the display was constructed to be in an uncolored bright state under no applied voltage, while in a dark and bluish colored state under an applied voltage.

Subsequently, the dependence of the spectral reflectivity upon the viewing angle of the thus fabricated liquid crystal display device was measured using a liquid crystal measurement apparatus LCD-5000 from Ohtsuka Denshi Co. For the measurements, a standard white board was referred to the standard. After the angle between light incident onto the display and the direction normal to the display plane was adjusted to be 50°, and the direction of reflected light detection was also adjusted to be normal to the display plane, the measurements were carried out by rotating the liquid display cell from 0° to 360° around the normal direction.

Subsequently, there obtained were a color matching function in the XYZ-color coordinate system according to JIS-Z8701, and tri-stimulus values X, Y and Z, using the D65 standard light source distribution. Further, from the values obtained above, a luminosity index L* and chromaticity indices a* and b* were calculated.

For light beams incident from 12 o'clock direction (i.e., ψ=180°), the values were obtained such as L*=26.4, a*=−5.8 and b*=5.9. The color difference was obtained comparing with that obtained from the luminosity index and chromaticity index for the light incident onto the display normal to the display plane from the following equation.

$$\Delta E^* = \{(\Delta L^*)^2 + (\Delta a^*)^2 + (\Delta b^*)^2\}^{1/2} \quad (3)$$

The results and the dependence thereof on the angle (ψ) of the incident light is shown in FIG. 4. As shown in FIG. 4, the relation $\Delta E^*$<6 was obtained for an arbitrary value of ψ.

When the liquid crystal display was visually observed, no color change depending on the viewing angle was realized, and the display exhibited an excellent visibility.

In addition, when the display was subjected to the multiplex drive under the conditions of 1/33 duty and 1/5 bias, the change in display contrast versus the viewing angle was obtained as shown in FIG. 5. As shown in FIG. 5, the contrast of at least 2 was obtained for the present case of light beams incident at 50° angle onto the display.

Example 2

A further liquid crystal display panel was fabricated in a similar manner to Example 1. with the exception that upper and lower polarizing plates were placed with the directions of the transmission axes of the upper and lower polarizing (semi-transparent) plates to be $\psi_{UT}$=10° and $\psi_{LT}$=80°, respectively.

Subsequently, a luminosity index, chromaticity index and color difference were measured under the conditions similar to those in Example 1. The results and the dependence of ΔE* on the angle (ψ) of the incident light is shown in FIG. 4. For light beams incident from 12 o'clock direction, the respective values were obtained such as L*=28.2, a*=−8.4 and b*=8.7. In addition, ΔE*<9 was obtained for an arbitrary value of ψ. Further, when the liquid crystal display was visually examined, no color change depending on the viewing angle was observed and the display exhibited an excellent visibility.

Example 3

A liquid crystal display panel was fabricated in a similar manner to Example 1, with the exception that a plate composed of NPF-1225DU from Nittoh Denko Co was used as a transmissive color polarizing plate, and that a uniaxially drawn phase difference film NRF-R570 from Nittoh Denko Co, which had a retardation value of 570 nm, was interposed between the transmissive color polarizing plate and the substrate so as to result in the direction of the in-plane retardation axis of ψ=150°. The display panel was thus constructed to be an uncolored bright state under no applied voltage, while a dark state under an applied voltage, to thereby result in a so called black-and-white display panel.

The coloring due to the birefringence of the STN liquid crystal material was optically compensated by the present phase difference plate which was interposed between the transmissive color polarizing plate and the substrate. Therefore, the color change depending on the viewing angle was relatively small and the display contrast was high, to thereby result in excellent viewing angle characteristics.

Example 4

A liquid crystal display panel was fabricated in a similar manner to Example 3, with the exception that a phase difference film NRZ-R570 from Nittoh Denko Co, which had a retardation value of 570 nm, and refraction indices of which was three-dimensionally controlled, was interposed between the transmissive color polarizing plate and the substrate.

Since the change in the retardation value of the phase difference film itself with the viewing angle was decreased further from that in Example 3, viewing angle characteristics were further improved.

Comparative Example 1

A liquid crystal display panel was fabricated in a similar manner to Example 1, with the exception that glass beads, having a diameter of about 7.3 microns, were used as spacers, and that a nematic liquid crystal material was used, which had a refractivity anisotropy of $\Delta n_{LC}=0.117$ at 589 nm wavelength and an intrinsic pitch of 13.6 microns. Further, the upper and lower polarizing plates were placed such that the directions of the transmission axes of the upper and lower polarizing (semi-transparent) plates were $\psi_{UT}=20°$ and $\psi_{LT}=70°$, respectively.

Subsequently, a luminosity index, chromaticity index and color difference were measured under the conditions similar to those in Example 1. The results and the dependence of ΔE* on the angle (ψ) of the incident light is shown in FIG. 4. For light beams incident from 12 o'clock direction, the respective values were obtained such as L*=25.7, a*=5.7 and b*=5.5, that is, almost colorless. However, the dependence of ΔE* on the angle (ψ) of the incident light is shown considerably larger than those in Examples 1 and 2.

Comparative Example 2

A further liquid crystal display panel was fabricated in a similar manner to Comparative Example 1, with the exception that the rubbing alignment was made to result in a twist angle of 220° for a liquid crystal layer.

Subsequently, a luminosity index, chromaticity index and color difference were measured under the conditions similar to those in Example 1. The results and the dependence of ΔE* on the angle (ψ) of the incident light is shown in FIG. 4. For light beams incident from the 12 o'clock direction, the respective values were obtained such as L*=25.1, a*=7.7 and b*=4.8, that is, almost colorless. However, the dependence of ΔE* on the angle (ψ) of the incident light is shown considerably larger than those in Examples 1 and 2.

Preferred Embodiments of the Invention Include:

A. A liquid crystal display apparatus comprising:
a liquid crystal cell having a structure in which a liquid crystal layer is sandwiched between a pair of transparent substrates each having at least one electrode, and liquid crystal molecules in said liquid crystal layer are oriented substantially in parallel to the surface of said substrate and twisted at an angle in the thickness direction of said liquid crystal layer when voltage is not applied,
a pair of polarizers disposed so as to sandwich said liquid crystal cell there between,
wherein the angle of the polarized light transmission axis of said polarizer to the orientation of liquid crystal molecules in the middle of said liquid crystal layer is less than 10°.

B. A liquid crystal display apparatus as above, wherein a change of a retardation of a substrate on tilting angle 50° from a retardation of a substrate no tilting is less than 80 nm.

C. A liquid crystal display apparatus as above, wherein the angle of the orientation of liquid crystal molecules on the surface of one substrate to the polarized light transmission axis of said polarizer adjacent to the substrate is in the range of from 30° to 60°.

D. A liquid Crystal display apparatus as any above, wherein the angle of the orientation of liquid crystal molecules on the surface of one substrate to the polarized light transmission axis of said polarizer adjacent to the substrate is in the range of from 30° to 60°.

E. A liquid crystal display apparatus as any above, wherein the twisted angle of liquid crystal molecules is in the range of from 40° to 140°.

F. A liquid crystal display apparatus as any above, wherein the twisted angle of liquid crystal molecules is in the range of from 40° to 140°.

G. A liquid crystal display apparatus as any above, wherein the twisted angle of liquid crystal molecules is in the range of from 40° to 140°.

H. A liquid crystal display apparatus as any above, wherein the twisted angle of liquid crystal molecules is in the range of from 40 ° to 140 °.

I. A liquid crystal display apparatus as any above, wherein the twisted angle of liquid crystal molecules is in the range of from 220° to 320°.

J. A liquid crystal display apparatus as any above, wherein the twisted angle of liquid crystal molecules is in the range of from 220° to 320°.

K. A liquid crystal display apparatus as any above, wherein the twisted angle of liquid crystal molecules is in the range of from 220° to 320°.

L. A liquid crystal display apparatus as any above, wherein the twisted angle of liquid crystal molecules is in the range of from 220° to 320°.

M. A liquid crystal display apparatus as any above, wherein the twisted angle of liquid crystal molecules is in the range of from 220° to 320°.

N. A liquid crystal display apparatus as any above, wherein the twisted angle of liquid crystal molecules is in the range of from 220° to 320°.

O. A liquid crystal display apparatus as any above, wherein the twisted angle of liquid crystal molecules is in the range of from 220° to 320°.

P. A liquid crystal display apparatus as any above, wherein the twisted angle of liquid crystal molecules is in the range of from 220° to 320°.

Q. A liquid crystal display apparatus as any above, wherein the substrate formed square, one side of the substrate parallels the orientation of liquid crystal molecules in the middle of said liquid crystal layer.

More Preferred Embodiments Include:

(AA) A liquid crystal display device comprising:

a liquid crystal cell including two transparent plastic substrates arranged substantially in parallel, each substrate with a confronting surface bearing at least one electrode, an alignment film disposed over said at least one transparent electrode, a layer of nematic liquid crystal material contained between said substrate, said liquid crystal material being twisted in a predetermined angle, and a pair of polarizing plates each provided on the outer surface of each said substrate, wherein said substrate is an optically anisotropic body, in which refractive indices in the surface direction are different from that in the thickness direction of said substrate, and wherein an angle is preferably at most 10° between either the transmission or absorption axis of said polarizing plates, and the alignment direction of liquid crystal molecules in the middle portion in the thickness direction of said liquid crystal layer.

(BB) The liquid crystal display device according to (AA), wherein a retardation value obtained for said substrate when viewed from the direction of a tilted angle of 50° is different by at most 80 nm from that when viewed frontally.

(CC) The liquid crystal display device according to (AA), wherein an angle is preferably 30° to 60° between the alignment direction of said liquid crystal molecules on said substrate and either a transmission or an absorption axis of said polarizing plate neighbored to said substrate.

(DD) The liquid crystal display device according to (AA), wherein said twist angle of said nematic liquid crystal layer is preferably 40° to 140°.

(EE) The liquid crystal display device according to (AA), wherein said twist angle of said nematic liquid crystal layer is preferably 220° to 320°.

(FF) The liquid crystal display device according to (AA), wherein said liquid crystal display device is preferably constructed such that its outward shape is preferably rectangular, and that the direction of a side of the rectangle and the alignment direction of said liquid crystal molecules in the middle portion in the thickness direction of said liquid crystal layer is preferably either parallel or orthogonal to each other.

Advantages of the Invention

More preferred embodiments (AA) and (BB).

The liquid crystal display device including plastic substrates according to the present invention is fabricated such that an angle is preferably at most 10° between either the transmission or absorption axis of the polarizing plates and the alignment direction of liquid crystal molecules in the middle portion in the thickness direction of the liquid crystal layer. With the present structure of the invention, the effects on the viewing angle characteristics of the display device by the change in the retardation value can be minimized, even though a plastic film substrate is used, which is optically anisotropic, having a different refractive index along the film thickness direction from that in-plane directions. More preferred embodiments (CC), (DD) and (EE).

By adjusting a plurality of recited angles as specified in the more preferred embodiments, the birefringence of the liquid crystal molecules can be utilized effectively. The structure according to the present invention is useful for fabricating an STN liquid crystal display device utilizing the birefringence of the liquid crystal molecules, and especially for a normally white display device which is in a bright state under no applied voltage. This structure is also effective on an OMI mode display device, in which an angle is adjusted to be parallel each other between the alignment direction of liquid crystal molecules in the vicinity of the substrate and the direction of polarizing axis of a phase difference plate. In addition, the present structure is also effective on a black-and-white STN type display device, in which a phase difference film is interposed between a liquid crystal cell and a polarizing plate. More preferred embodiments (FF).

With the present display device structure, several parts for fabricating the display device such as, for example, substrates and polarizing plates can be brought out from respective raw rolls in either parallel or perpendicular manner. This makes the efficient use feasible of the area available out of the rolls, to thereby facilitating the reduction of the production costs, for example.

Several other preferred embodiments of the present invention will be described hereinbelow.

(AAA). A liquid crystal display device, including a liquid crystal cell having two transparent plastic substrates arranged substantially in parallel, each substrate with a confronting surface bearing at least one electrode; an alignment film disposed over the at least one transparent electrode; a layer of nematic liquid crystal material contained between the substrate, the liquid crystal material being twisted in a predetermined angle, and a pair of polarizing plates each provided on the outer surface of each substrate. The above-mentioned plastic film substrate is characterized to be an optically anisotropic body, and refractive indices in the surface direction are different from that in the thickness direction of the substrate. In addition, an angle is preferably at most 10° between either the transmission or absorption axis of the polarizing plates and the alignment direction of liquid crystal molecules in the middle portion in the thickness direction of the liquid crystal layer.

(BBB). The liquid crystal display device described in the above paragraph (AAA), in which a refractive index along the film thickness direction is smaller than refractive indexes along in-plane directions.

(CCC). The liquid crystal display device described in the above paragraph (AAA) or (BBB), in which the retardation value along the surface plane is as small as about 10 nm.

(DDD). The liquid crystal display device described in the above paragraph (AAA), (BBB) or (CCC), fabricated such that an angle is preferably at most 10° between the direction of either a retardation axis (the direction with the maximum refractive index) or an advancing phase axis (the direction perpendicular to the maximum refractive index direction), and the alignment direction of liquid crystal molecules in the middle portion in the thickness direction of the liquid crystal layer.

(EEE). The liquid crystal display device described in the above paragraph (AAA), (BBB), (CCC) or (DDD), in which a retardation value obtained for the substrate when viewed from the direction of a tilted angle of 50° is different from that when viewed frontally, preferably by at most 80 nm, more preferably by at most 40 nm.

(FFF). The liquid crystal display device described in the above paragraph (AAA), (BBB), (CCC), (DDD) or (EEE), in which an angle is preferably 30° to 60° between the alignment direction of said liquid crystal molecules on the substrate and either a transmission or an absorption axis of the polarizing plate neighbored to the substrate.

(GGG). The liquid crystal display device described in the above paragraph (AAA), (BBB), (CCC), (DDD), (EEE) or (FFF), in which a phase difference film is interposed between a liquid crystal cell and at least one of polarizing plates.

(HHH). The liquid crystal display device described in the above paragraph (AAA), (BBB), (CCC), (DDD), (EEE), (FFF), or (GGG), which is fabricated to be in an uncolored bright state under no applied voltage, while in a dark and bluish colored state under an applied voltage.

(III). The liquid crystal display device described in the above paragraph (AAA), (BBB), (CCC), (DDD), (EEE), (FFF), (GGG) or (HHH), which is fabricated such that its outward shape is preferably rectangular, and that the direction of a side of the rectangle and the alignment direction of the liquid crystal molecules in the middle portion in the thickness direction of the liquid crystal layer is preferably either parallel or perpendicular to each other.

What is claimed as new and is desired to be secured by Letters Patent of the United States is:

1. A liquid crystal display apparatus comprising:

a liquid crystal cell having a structure in which a liquid crystal layer is sandwiched between a pair of transparent substrates, said pair comprised of an upper substrate and a lower substrate, each having at least one electrode, and liquid crystal molecules in said liquid crystal layer are oriented substantially in parallel to the surface of each of said substrates and twisted at an angle in the thickness direction of said liquid crystal layer when voltage is not applied, a pair of polarizers, said pair comprised of an upper polarizer and a lower polarizer, disposed so as to sandwich said liquid crystal cell therebetween, wherein said liquid crystal molecules in said liquid crystal layer are comprised of liquid crystal molecules in a middle portion of said layer;

wherein an angle formed between the polarized light transmission axis of said upper polarizer and the orientation direction of liquid crystal molecules in the middle of said liquid crystal layer is less than 10°; and wherein an angle between the polarized light transmission axis of said lower polarizer and the orientation direction of said liquid crystal molecules in the middle of said liquid crystal layer is less than 10°;

and wherein a change of a retardation of each of said substrates on tilting angle 50° from a retardation of each of said substrates no tilting is less than 80 nm.

2. A liquid Crystal display apparatus of claim 1, wherein said liquid crystal molecules in said liquid crystal layer are further comprised of liquid adjacent to the surface of said upper substrate and liquid crystal molecules adjacent to the surface of said lower substrate;

wherein an angle formed between the polarized light transmission axis of said upper polarizer and the orientation direction of said liquid crystal molecules adjacent to said surface of said upper substrate ranges from 30° to 60°;

wherein an angle formed between the polarized light transmission axis of said lower polarizer and the orientation direction of said liquid crystal molecules adjacent to said surface of said lower substrate ranges from 30° to 60°.

3. A liquid crystal display apparatus of claim 2, wherein the twisted angle of liquid crystal molecules is in the range of from 40° to 140°.

4. A liquid crystal display apparatus of claim 3, wherein the twisted angle of liquid crystal molecules is in the range of from 220° to 320°.

5. A liquid crystal display apparatus of claim 2, wherein the twisted angle of liquid crystal molecules is in the range of from 220° to 320°.

6. A liquid crystal display apparatus of claim 1, wherein the twisted angle of liquid crystal molecules is in the range of from 40° to 140°.

7. A liquid crystal display apparatus of claim 6, wherein the twisted angle of liquid crystal molecules is in the range of from 220° to 320°.

8. A liquid crystal display apparatus of claim 1, wherein the twisted angle of liquid crystal molecules is in the range of 220° to 320°.

* * * * *